July 4, 1933.  F. GROSSI  1,916,508
TURF RESTORATOR
Filed Oct. 6, 1932  3 Sheets-Sheet 2

INVENTOR
Frank Grossi
BY
Pennie, Davis, Marvin & Edmonds
ATTORNEYS

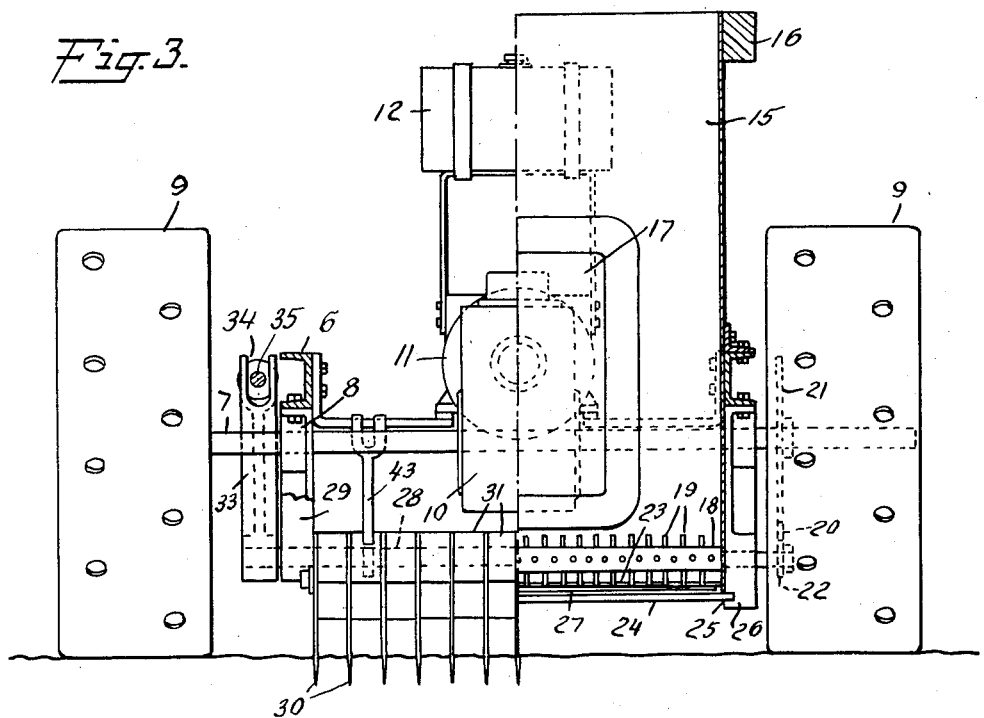
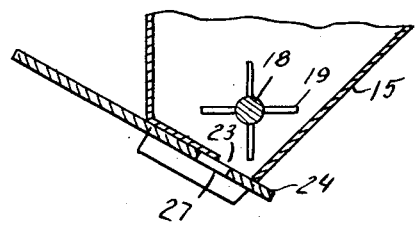
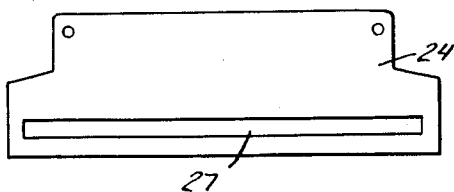

Patented July 4, 1933

1,916,508

UNITED STATES PATENT OFFICE

FRANK GROSSI, OF MAMARONECK, NEW YORK

TURF RESTORATOR

Application filed October 6, 1932. Serial No. 636,437.

This invention relates to apparatus for use in seeding and fertilizing turf and more particularly concerns improvements in a unitary device for rapidly planting seed and depositing fertilizing material on a sodded area.

Sodded areas, such as lawns, golf courses and like tracts, require considerable care and attention if the grass is to be kept in a healthy condition. This is particularly true of the grass on the greens of golf courses, where the turf must be cut very short and the uniform quality and texture thereof is highly important. During dry periods, the closely cut grass dries out quickly and even with daily sprinkling, some of the grass dies and renders the green unfit for use. Further, frequent watering of the grass often results in too much moisture near the surface of the sod and an uneven surface may result.

In my Patent No. 1,829,745, I have disclosed and claimed an improved machine for treating sodded areas of the type referred to, which machine cuts a plurality of slits in the sod surface, deposits grass seed or fertilizer or a mixture of these materials in the slits, closes the slits and levels and rolls the surface treated.

It is the object of the present invention to provide certain important improvements in the machine of my above noted patent. Thus, the present invention includes improved means for resiliently mounting the turf cutting members or knives of the machine whereby these knives may readily move upon encountering a rock or other obstruction. Another important improvement resides in the provision of means for simultaneously controlling the position of the cutting means relative to the turf surface and the rate of flow of seed and/or fertilizer, whereby the amount of material deposited on the turf is at all times proportional to the depth of the cuts formed by the knives. This feature has the added advantage of automatically cutting off the flow of material to the turf when the knives are lifted out of contact therewith. Thus, upon the manipulation of a single manual control means, the machine may be rendered inoperative both as to the action of the knives and the flow of material to the turf, and in this condition may be moved from one green or area requiring treatment to another.

Various other objects, advantages and characteristic features of the invention will be apparent as the description thereof progresses.

The invention will be best understood by reference to the accompanying drawings, in which;

Figure 3 is a sectional end view taken from the rearward end of the machine looking forward;

Figure 4 is an enlarged sectional view of the agitating and feeding mechanism; and Figure 5 is an enlarged plan view of the feed controlling gate.

Figure 1:
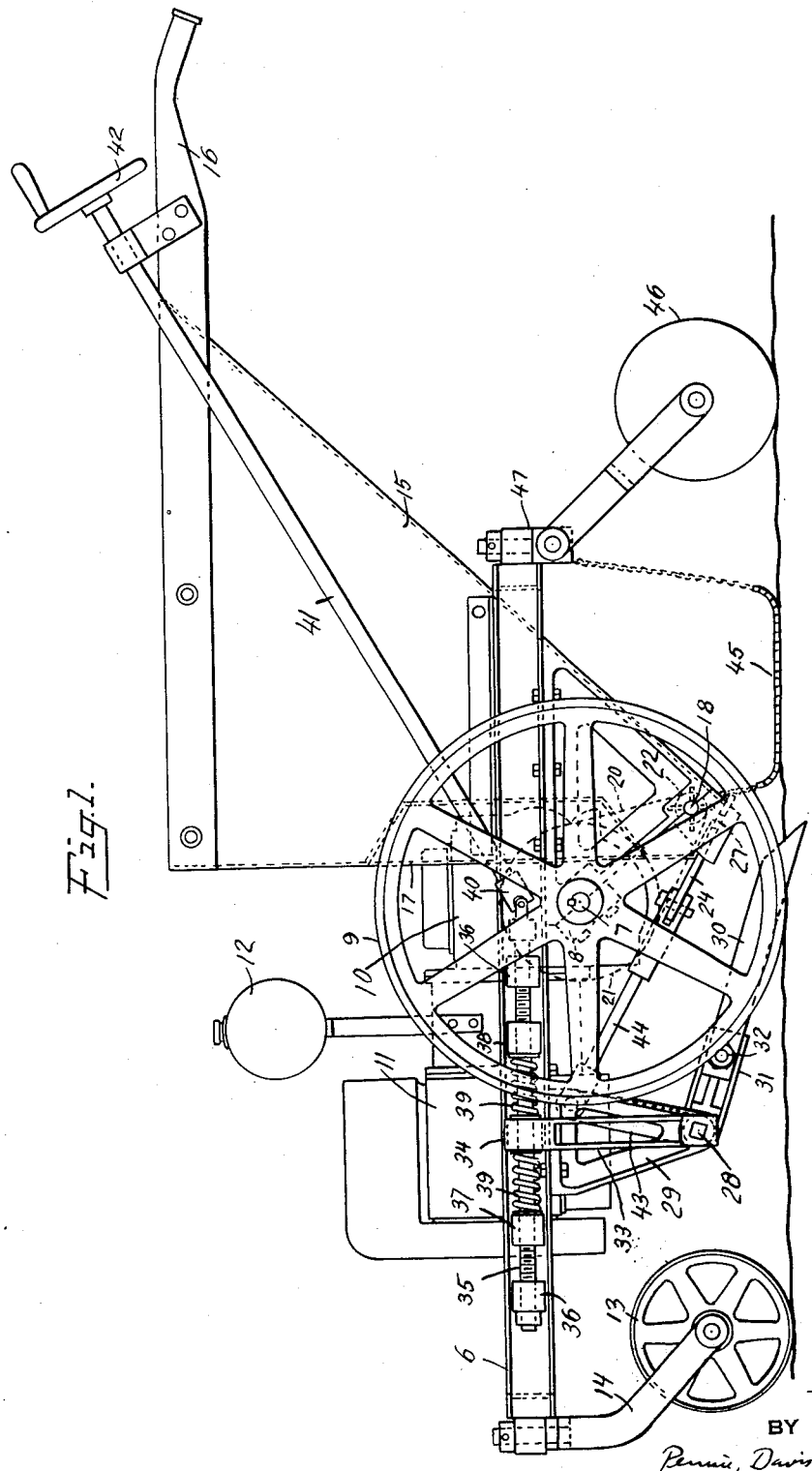
Figure 1 is a side elevation of one embodiment of my improved machine.

Referring to the drawings, the disclosed embodiment of my invention includes a three wheeled vehicle having a generally rectangular frame 6 carrying an axle 7 in the journals 8. The axle carries the driving wheels 9 and passes through a differential housing 10. The machine is preferably motor driven, and an internal combustion engine 11 with a fuel tank 12 has accordingly been shown in the drawings. Other propelling means may, of course, be employed within the scope of the invention. The single front wheel 13 is journaled between the arms of a fork 14 which is suitably pivotally connected to the forward end of the frame 6, as shown.

Figure 2:
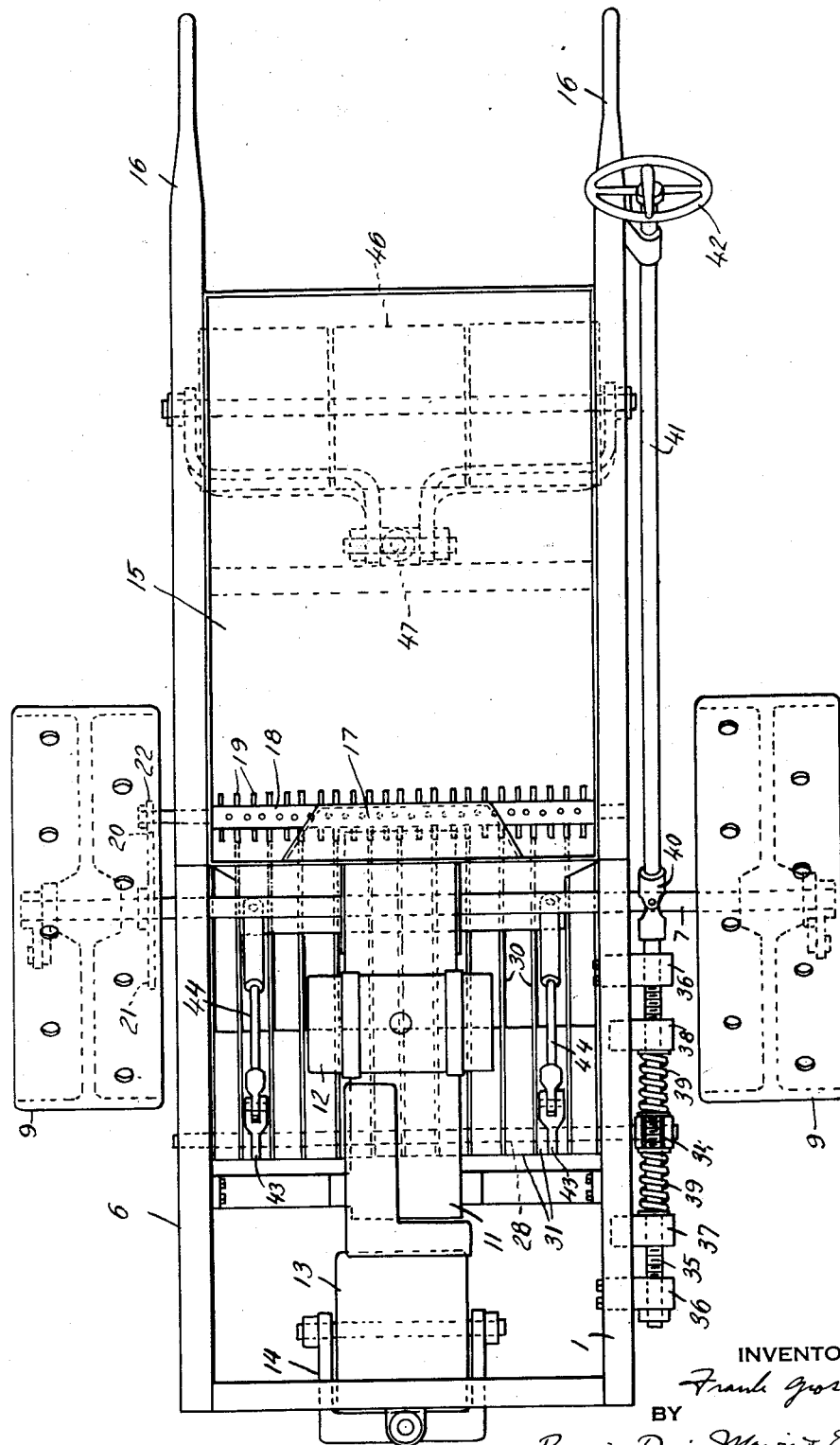
Figure 2 is a plan view of the machine shown in Figure 1.

A storage bin 15 is suitably secured to the frame 6 directly to the rear of the axle 7. As shown in Figure 2, the bin 15 extends across the entire width of the frame 6 and is tapered toward its lower end to facilitate the delivery of the material therefrom. A pair of longitudinally extending handles 16 are preferably secured along the upper edges of the bin 15 and extend rearwardly for manipulation by an operator walking behind the machine. In the disclosed embodiment, the forward end of the bin 15 is provided with a recess 17 to accommodate the differential housing 10.

A transverse shaft 18 is rotatably disposed adjacent the lower discharge apex of the bin 15, and a plurality of radially extending arms 19 are fixed along this shaft, as best shown in Figs. 2, 3 and 4. The shaft 18 is driven through a chain 20 and sprockets 21 and 22 from the main axle 7 of the machine, and the rotation of this shaft serves to agitate the material in the bin 15 and so insures the continuous feeding of this material from the bin when the machine is in motion.

As shown in Figures 1 and 4, an opening 23 is provided at the lower apex of the bin 15 and the flow of material from this opening is controlled by a valve or gate 24. The gate 24 is carried in slots 25 near the lower ends of the brackets 26 (Figure 3) and is thus slidably supported over the opening 23. The gate 24 has a transverse opening 27 therein adapted to cooperate with the opening 23 in the bin 15. It will be seen that when the gate 24 is moved rearwardly, the openings 27 and 23 cooperate to permit the flow of material from the bin, and that as the gate 24 is moved forwardly, its flow is decreased and finally cut off. The means for operating the gate 24 will be hereinafter described.

A transversely extending knife carrying shaft 28 is journaled in a pair of brackets 29 fixed to and depending from the frame 6. A plurality of turf cutting knives 30 are fixed to this shaft in any suitable manner. As shown in the drawings, the shaft 28 is squared between the brackets 29 and this shaft passes through squared openings near forward ends of the knife blades. The knives are equally spaced apart transversely of the machine along the shaft 28 by means of spacers 31 threaded on the shaft and extending rearwardly therefrom between the knives. A transverse bolt 32 passes through all of the knife blades and spacers and clamps them together in a unitary structure which turns with the shaft 28.

The knives are disposed with their sharp edges downward. The blades are preferably provided with very keen cutting edges and are gradually tapered toward these edges so that the slits formed by these blades are of appreciable width at the surface of the sod.

Referring now to the means for permitting resilient movement and adjustable control of the knives, a lever 33 having a bifurcated upper end 34 is fixed to the squared head of the knife shaft 28 at one side of the machine. The bifurcated end 34 of the lever 33 embraces but does not engage a threaded shaft 35 which is rotatably carried in two spaced journals 36 fixed to the frame of the machine. A pair of stop lugs 37 and 38 are threaded on the shaft 35, one on each side of the bifurcated end 34 of the lever 33, and a coiled compressed spring 39 is disposed between the lever end 34 and each of the lugs 37 and 38. In this manner, the upper end 34 of the lever 33 is floated between the two lugs 37 and 38 by the springs 39, and accordingly, the knives 30 may move resiliently either upwardly or downwardly from a central adjusted position. This arrangement permits the knives to rise when they encounter a rock, root or other hard obstacle in the turf, and thereby prevents breaking the knives or unduly dulling their cutting edges. The floating spring arrangements insures the return of the knives to their adjusted position after the obstacle has been passed.

As shown in Figure 2, the stop lugs 37 and 38 have extensions protruding into the channel of the machine frame 6, and these lugs are thus held from rotating when the threaded shaft 35 is turned. The shaft 35 is connected through a universal joint 40 and a shaft 41 to a hand wheel 42 located adjacent one of the machine handles 16. It will be readily understood that rotation of the hand wheel 42 in one direction moves both of the lugs 37 and 38 forwardly along the shaft 35, thus moving the upper end 34 of the lever 33 forward, turning the knife shaft 28 in a counter-clockwise direction, as viewed in Figure 1, and lifting the cutting edges of the knives. Obviously, rotation of the hand wheel 42 in the opposite direction has the opposite effect of depressing the cutting edges of the knives. In this manner, the depth of the slits cut by the knife blades may be variably adjusted to suit the turf conditions and also the knives may be readily lifted out of contact with the turf when it is desired to move the machine from one operating location to another.

As explained above, it is a feature of the invention to provide simultaneous control of the positions of the knife blades and the rate of delivery of the material from the bin. In the disclosed embodiment, this is accomplished by a mechanical connection between the adjustable knife carrying shaft 28 and the bin feed controlling gate 24. A pair of suitable levers 43 are respectively fixed at one end of the shaft 28 and connected at their free ends to links 44 attached to spaced points on the gate 24. With this arrangement, as the knife blades are depressed to cut tapered slits in the turf, the levers 43 operate through the links 44 to move the gate 24 rearwardly, thus enlarging the opening and increasing the rate of flow of material from the bin 15. The length of the links 44 is preferably adjustable, as for example, by threading the rods of these into the gate engaging heads thereof. It is preferred to so adjust the length of the links 34 that the gate 24 will completely shut off the flow of material from the bin 15 when the knives 30 are lifted out of contact with the turf.

The above described simultaneous action of the knives and the grass seed and fertilizer feed has several advantages. With this arrangement, when the knives are lifted to permit the movement of the machine over areas which do not require treatment, the feed of material is cut off and no material is wasted.

Also, during operation, the amount of material fed on to the surface is varied directly in accordance with the size of slits cut in the turf, and accordingly, the slits are always filled to the proper level with the seed or fertilizer or a mixture of these materials.

A flexible link drag 45 is preferably disposed transversely across the machine behind the outlet of the bin 15. This drag acts to close the slits cut in the sods by the knives 30 and to generally agitate the surface of the drag and distribute the seed and fertilizer thereover. A roller 46 of any suitable type is preferably attached to the rear end of the machine behind the drag 45 and acts to level off and pack down the sod surface. As shown, the roller 46 is preferably secured to the frame 6 of the machine through a universal connection 47.

The operation of the machine will be understood from the above description of this construction. The knife blades 30 may be set to cut any desired depth slits in the turf, and this setting also automatically sets the flow of seed and fertilizer from the bin at the proper value to correspond with the depth of the slits cut by the knives. The machine is then driven over the tract requiring treatment and when the machine is to be moved to another tract without operating on the intervening ground, the knife blades are lifted and the bin feed cut off by manipulation of the hand wheel 42.

I claim:

1. In a turf treating device of the character described, in combination, a vehicle, turf cutting knives mounted beneath the vehicle and extending into the surface over which the vehicle travels, resilient means for permitting movement of said knives out of said surface when said knives encounter an obstacle, a container on said vehicle having a discharge opening adjacent said knives and means for closing said discharge opening when said knives are moved out of said surface.

2. In a turf treating device of the character described, in combination, a vehicle, turf cutting knives mounted beneath the vehicle and movable into and out of the surface over which the vehicle travels, manually operable means for moving said knives to a plurality of adjusted positions at different depths in said surface and for lifting said knives out of said surface, a resilient connection between said knives and said adjusting means to permit movement of said knives away from an adjusted position when said knives encounter an obstacle, a container on said vehicle having a discharge opening adjacent said knives and means for closing said container opening when said knives are moved out of said surface by said manually operable means and when said knives are moved out of said surface by the operation of said resilient means.

3. In a turf treating device of the character described, in combination, a vehicle, a shaft extending transversely of the vehicle, a plurality of knives having downwardly disposed cutting edges fixed to and extending downwardly from said shaft and into the surface over which said vehicle operates, manually operable means for turning said shaft to various adjusted positions whereby the depth to which said knives cut said surface may be altered and a resilient connection between said manually operable means and said shaft whereby said knives may move in either direction from an adjusted position.

In testimony whereof I affix my signature.

FRANK GROSSI.